Feb. 3, 1925.

A. DOGLIONE 1,525,278

BICYCLE RACE APPARATUS

Filed June 22, 1922    3 Sheets-Sheet 1

WITNESSES

INVENTOR
Arthur Doglione
BY
ATTORNEYS

Feb. 3, 1925.
1,525,278
A. DOGLIONE
BICYCLE RACE APPARATUS
Filed June 22, 1922
3 Sheets-Sheet 2
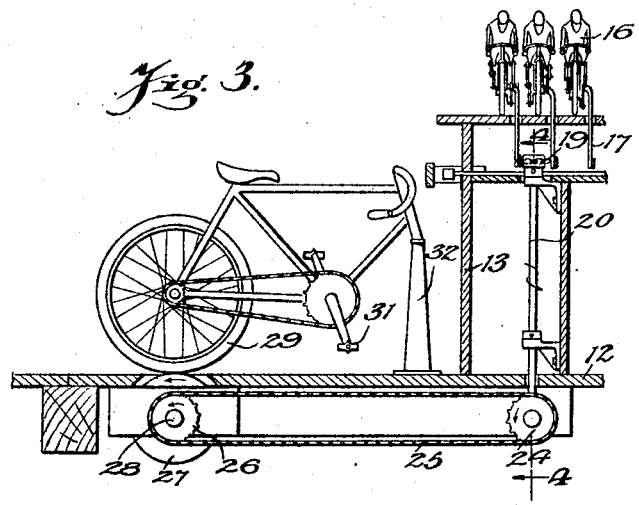
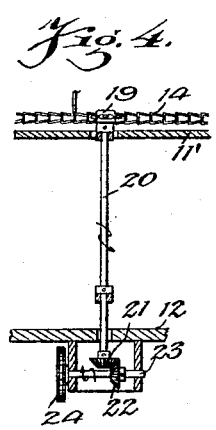
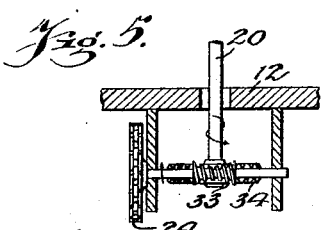
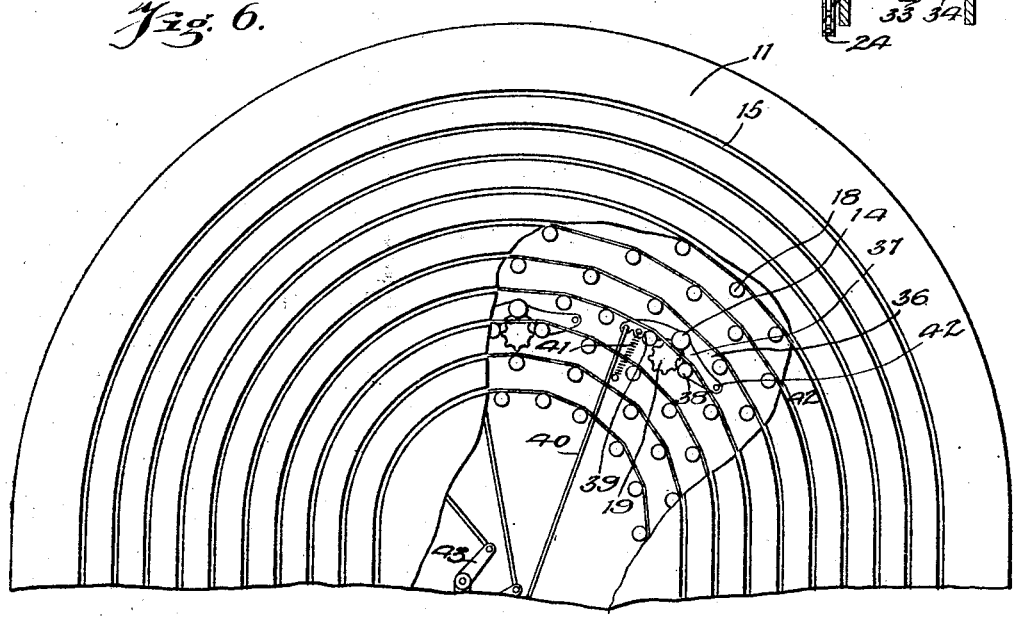
WITNESSES
INVENTOR
Arthur Doglione
BY
ATTORNEYS Feb. 3, 1925. 1,525,278
A. DOGLIONE
BICYCLE RACE APPARATUS
Filed June 22, 1922 3 Sheets-Sheet 3

Patented Feb. 3, 1925.

1,525,278

UNITED STATES PATENT OFFICE.

ARTHUR DOGLIONE, OF BROOKLYN, NEW YORK.

BICYCLE RACE APPARATUS.

Application filed June 22, 1922. Serial No. 570,142.

*To all whom it may concern:*

Be it known that I, ARTHUR DOGLIONE, a citizen of the United States, and a resident of the city of New York, borough of Brooklyn, in the county of Kings and State of New York, have invented a new and Improved Bicycle Race Apparatus, of which the following is a full, clear, and exact description.

The invention relates to an amusement apparatus and particularly to a bicycle-race apparatus and has for an object to provide an improved construction over Patent No. 1,315,098, issued September 2, 1919.

Another object of the invention is to provide an improved construction wherein the racing platform may be made of any desired size and length at a minimum cost.

A further object is to provide a bicycle-race wherein the racing members may be used by contestants while being under control of the attendant.

In the accompanying drawings—

Figure 3 is a sectional view through Figure 1 on line 3—3, the same being on an enlarged scale.

Figure 4 is a fragmentary sectional view through Figure 3 approximately on line 4—4.

Figure 5 is a fragmentary view partly in section showing a modified construction of the lower part of the mechanism shown in Figure 4.

Figure 6 is an enlarged fragmentary view of one end of the racing platform, certain parts being broken away for illustrating part of the control of the operator.

Figure 1:
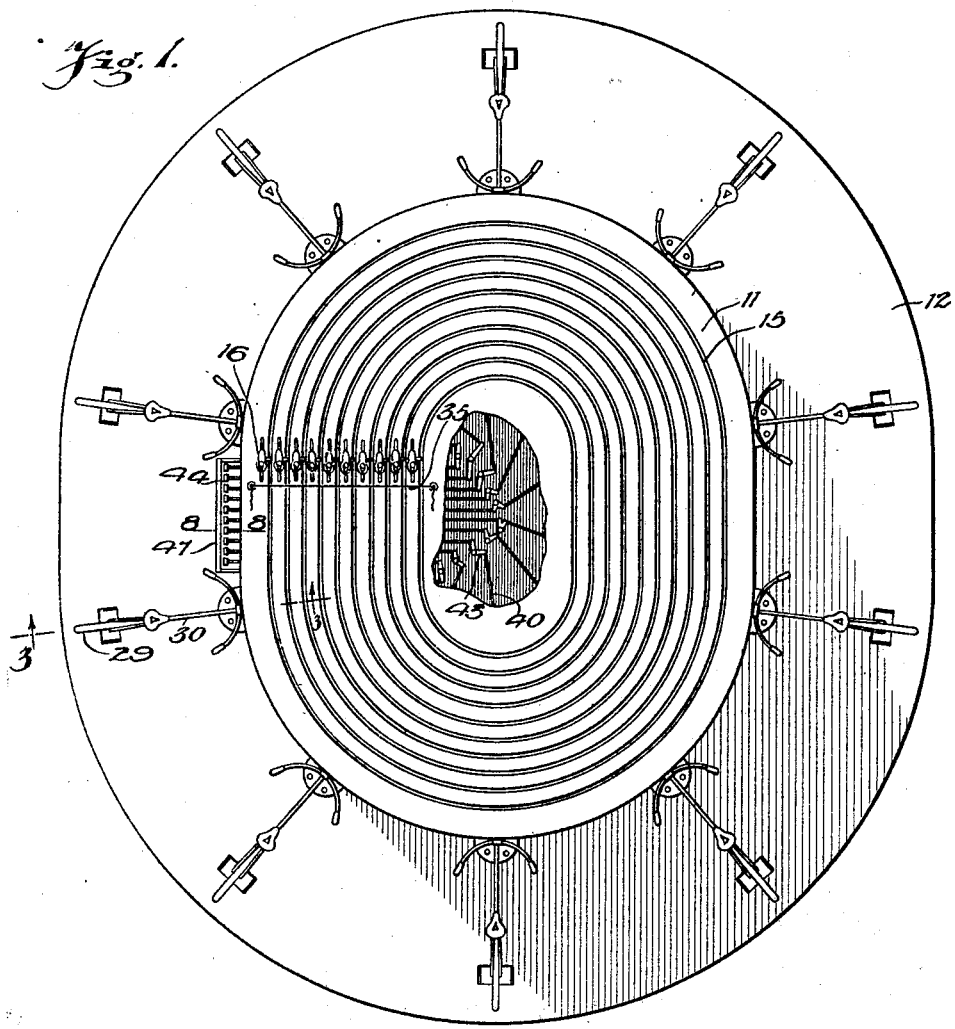
Figure 1 is a top plan view of an amusement apparatus disclosing an embodiment of the invention.
Figure 2:
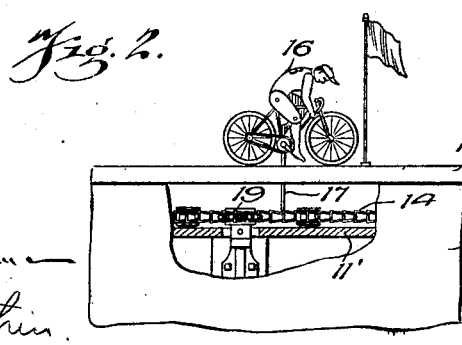
Figure 2 is a framentary side view on a somewhat enlarged scale of one of the figures shown in Figure 1, certain parts being broken away for better illustrating how the figure is moved.
Figure 7:
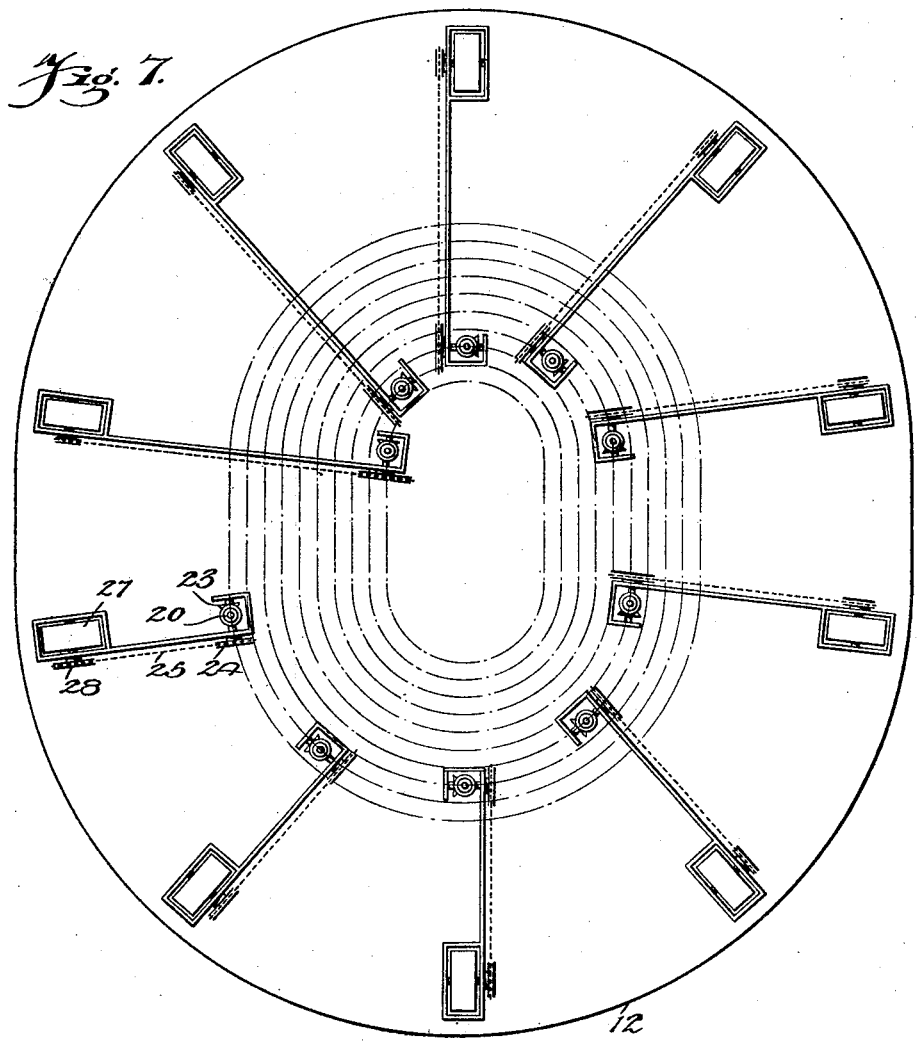
Figure 7 is a diagram indicated as a top plan showing how power is transmitted from the respective dummy bicycles to the racing figures.

Referring to the accompanying drawings by numeral, 11 indicates a racing platform and 12 a contestants' platform, said racing platform being supported on the platform 12 by any suitable supporting means, as for instance, the upright casing 13. The various platforms and upright 13 may be constructed of wood or of any desired material and may be, of course, made of any desired size. In my prior patent above referred to, the racing platform was made circular and, consequently, it would be unwieldy to make the same very large.

In the present invention, the racing platform 11 is made elongated which is possible by reason of the use of the chains 14 instead of the power ring in my former patent. The platform 11 is provided with a number of slots 15, there being one slot for each of the racing figures 16 which racing figures are preferably mounted on a miniature bicycle with articulated legs connected to the pedals of the bicycle whereby the legs will be moved and appear as if the figure on the bicycle was operating the bicycle. The wheels of the bicycle are rotated by reason of the contact of platform 11 whereas the frame is urged forward by a vertical rod 17 secured to chain 14. It will, of course, be understood that there is one chain 14 for each of the racing figures 16 and that all of the chains and all of the figures are of identical construction so that the description of one will apply to all.

The various chains 14 are held on an auxiliary platform 11′ by suitable guiding rollers 18 which may be ordinary smooth rollers or may be smooth rollers provided with flanges on the ends. These chains are moved by the respective sprocket wheels 19, there being one sprocket wheel for each chain. A shaft 20 is rigidly secured to each of the sprocket wheels 19, said shafts extending downwardly to a point below the platform 12 and to the lower ends of the rods are secured bevel gears 21 designed to mesh with the respective gears 22. Each gear 22 is provided with a shaft 23 on which a sprocket wheel 24 is mounted. Each of the sprocket wheels 24 is provided with a chain 25 passing over sprocket wheel 26 secured to the respective drums 27 in any desired manner, as for instance, through the shaft 28. The shaft 28 acts as a rotatable support for the drums 27 whereby the drums may freely rotate. The rear wheel 29 of the dummy bicycle 30 rests on drum 27 and when the usual pedals 31 of the bicycle 30 are operated by a contestant, the wheel 29 will rotate drum 27 and, consequently, move the parts just described for causing the chain 14 to travel and move the particular racing figures 16 secured thereto. The dummy bicycle 30 is in fact an ordinary bicycle as may be found on the market with the front wheel removed and a stationary support 32 substituted therefor whereby the wheel 29 may be properly held on the drum 27 at all times.

In Figure 1, ten bicycles 30 have been shown and other parts to correspond but it will be evident that a less number or a greater number may be used without departing from the spirit of the invention. It is also evident that when the apparatus is in use, all the bicycles could be used or any number.

Instead of providing the bevel gears 21 and 22 as shown in Figure 4, a worm 33 might be used in connection with a worm wheel 34. This construction is desirable where the platform 11 is small. Where the platform is small the racing figure 16 must move very slowly in order to give the various contestants an appreciable time on the bicycles 30. The use of the worm and worm wheel just described will permit a great reduction in speed from the bicycle 30 to the racing figures without presenting an unwieldy structure though it is evident that the various transmitting sprockets and other devices may be proportioned as preferred when using the structure shown in Figure 3.

Figure 8:
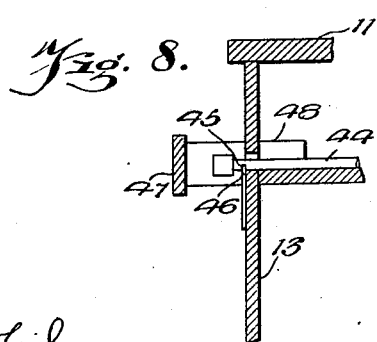
Figure 8 is an enlarged fragmentary sectional view through Figure 1 approximately on line 8—8.

When the apparatus is in use, the figures 16 are arranged in line as shown in Figure 1 near a starting line 35 and the parts are locked against movement until the proper signal is given. This locking is caused by disconnecting the chains from the driving mechanism including drum 27. As shown in Figure 6, each chain 14 is provided with a throw-out lever 36, said throw-out lever having a roller 37 normally holding the chain in engagement with the sprocket wheel 19. A pair of throw-out rollers 38 and 39 are carried by the lever 36 so that when the rod 40 is pushed against the action of the retractile spring 41, lever 36 will be swung on its pivotal support 42 and the rollers 38 and 39 pushed against the chain 14 until it moves away from the sprocket wheel 19. This will immediately stop the movement of the chain and, consequently, the movement of the figures 16. The various rods 40 are actuated through suitable levers 43, said levers in turn being actuated by the various rods 44 extending to the operator's stand near line 35. The rods 44 (Figure 8) are each provided with a notch 45 adapted to receive the locking clip 46 and move to an inner position. When it is desired to reverse the lever 36 so as to connect the chains 14 with their respective sprocket wheels 19, rod 40 is moved until it is out of engagement with the locking clip 46 and then the spring 41 will move the lever and roller 34 over into the position shown in Figure 6. This release takes place at the time the signal to start the race has been given.

In order to stop all of the racing figures 16 when the first one reaches the line 35, a bar 47 is used said bar being supported by sliding end supports 48. When the first racing figure 16 reaches the line 35, the attendant immediately pushes bar 47 quickly toward the wall 13 so that the rods 40 will all quickly assume the position shown in Figure 8 and thereby throw out of action all of the chains 14. The attendant may then easily determine which is the winner of the race even though some of the contestants continue to operate the pedals of their bicycles. After the winner has been determined the racing figures 16 are re-assembled as shown in Figure 1 and the apparatus is again in condition for a new race.

What I claim is:—

1. In an amusement device of the character described, a racing platform, a plurality of racing figures mounted on the platform, means for actuating said racing figures, said means including an endless traveling chain for each figure, a power mechanism, manually actuated means for disengaging said chains from said power mechanism, said manually actuated means including a pivotally mounted lever, a roller for normally holding the chain in operative position, a pair of rollers for moving the chain to an inoperative position when the lever is swung to a given position, and actuating rods for moving said lever to an inoperative position.

2. In an amusement device of the character described, a racing platform, a contestants' platform, a plurality of racing figures arranged on the racing platform, a plurality of manually actuated bicycles arranged on the contestants' platform, means for connecting said contestants' bicycles with the racing figures, said means including a sprocket for each figure, and an endless traveling chain for each figure, a pivotally mounted lever arranged adjacent each of said sprocket wheels, a roller carried by said lever, a spring acting on the lever for causing the same to move to a position whereby the roller will hold the chain in engagement with the sprocket wheel, a second pair of rollers arranged on said lever, manually actuated means for moving said lever in such a direction as to cause said second pair of rollers to move the chain out of engagement with the sprocket wheel, and a lock for said last mentioned means.

3. In an amusement apparatus of the character described, a racing platform having a plurality of slots, a figure for each slot having a rod extending through its particular slot, and endless chain secured to each of said rods, means for guiding said chains, a sprocket wheel for each of the chains for actuating the same, a full size dummy bicycle for actuating each of said sprocket wheels, a roller arranged on each side of each of said sprocket wheels, a swinging lever supporting said rollers, and a manually actuated reciprocating rod for swinging said lever to cause the same to move the rollers against said chains and the chains away from the respective sprocket wheels.

ARTHUR DOGLIONE.